United States Patent Office 3,387,022
Patented June 4, 1968

3,387,022
2,2,4-TRIMETHYL-1,3-PENTANEDIOL METHACRYLATE COMPOSITIONS
Hugh J. Hagemeyer, William J. Gammans, and Alfred G. Robinson, Longview, Tex., assignors to Eastman Kodak Company, Rochester, N.Y., a corporation of New Jersey
No Drawing. Filed Oct. 14, 1964, Ser. No. 403,911
1 Claim. (Cl. 260—486)

ABSTRACT OF THE DISCLOSURE

Mono- and di-methacrylate esters of 2,2,4-trimethyl-1,3-pentane diol found to have special utility as adhesives in the preparation of coatings, molded articles and the like.

---

This invention relates to new compositions of matter and their preparation. In particular, the present invention relates to the mono- and dimethacrylate esters of 2,2,4-trimethyl-1,3-pentanediol (TMPD). These esters give homo and copolymers having special utility as adhesives and in the preparation of coatings, molded articles and the like.

Methacrylate esters of glycols have found wide use in coating, adhesive, and molding applications. For example, glycol monomethacrylates are used in the formulation of thermosetting lacquers. Such lacquers suffer, however, from the disadvantage of premature polymerization. Moreover, the products have poor hydrolytic stability since the commonly employed glycols are water soluble. Moreover, the high cure exotherm of these lacquers results in poor dimensional stability and often in polymer degradation.

Objects of the present invention therefore are: to provide polymerizable materials which are easily prevented from prematurely polymerizing and which readily copolymerize with a wide variety of vinyl monomers to impart insolubility and rigidity characteristics to the final polymer; to provide such materials which may be readily incorporated into thermoplastic systems and thereafter curable to enhance certain of the properties thereof without resulting in exothermically induced degradation; to provide exceptionally useful adhesives for metals, and to provide such aforesaid polymerizable materials which are useful by themselves as heat curable, stable adhesives.

In accordance with the present invention these and other objects hereinafter becoming evident have been achieved through the discovery that both the mono- and dimethacrylate esters of TMPD are especially suitable for coatings, adhesives, and molding applications. These esters can be prepared by conventional methods from TMPD and can be readily stabilized to avoid premature polymerization. The monomethacrylate esters of TMPD, when copolymerized with methyl methacrylate in lacquer formulations, gives films having excellent adhesion and acetone resistance. The dimethacrylate ester of TMPD when used in polyvinyl chloride plastisols results in molded objects having superior hardness and stiffness properties. No evidence of thermal degradation is found. Moreover, these esters are readily copolymerized with other monomers such as methyl methacrylate, styrene, vinyl acetate, acrylonitrile, and other typical vinyl monomers.

The preparation of the methacrylate esters of TMPD is carried out using either conventional ester interchange or direct esterification reaction conditions. In the ester interchange process, TMPD is reacted with methyl methacrylate using either acidic or basic catalysts at concentrations of 0.5 to 5 percent. The reaction temperature can be controlled by the combined or separate use of reduced pressures, the use of an inert diluent or an excess of methyl methacrylate. Methanol is removed as formed.

After catalyst removal, the pure methacrylate esters of TMPD are isolated by distillation at reduced pressure. Alternatively, TMPD may be directly esterified with methacrylic acid using an acidic catalyst. In either process, a stabilizer such as hydroquinone may be used to inhibit polymerization. The following examples will illustrate these preparations.

Example 1.—A mixture consisting of 146 grams (1 mole) of TMPD, 500 grams (5 moles) of methyl methacrylate, and 3 grams (0.6 percent, based on methyl methacrylate) of hydroquinone was charged to a one-liter flask fitted with a pressure-equalizing dropping funnel, a thermometer, and a capillary tube for the introduction of air. The funnel was charged with a 2.0 N solution of sodium methoxide in methanol and the apparatus attached to a 10-tray Oldershaw column fitted with a variable-reflux head. The mixture was heated to 60° C. under a pressure of 200 mm., and 10 ml. of the sodium methoxide solution was introduced. When the vapors at the head of the column reached 34° C. (the boiling point of the methanol-methyl methacrylate azeotrope at 200 mm.) the head was adjusted for 50 percent take-off. Catalyst solution was added in small amounts to the reaction mixture during the entire six-hour reaction period until 30 ml. had been added. The base temperature ranged from 55–70° C., and the head temperature remained constant at 34° C. The reaction mixture was then neutralized with dilute acetic acid and washed with water and a saturated salt solution. The excess methyl methacrylate was flashed at reduced pressure and, after adding hydroquinone, (about three percent by volume) the residue was distilled to give 133 grams of the monomethacrylate of TMPD and 113 grams of the dimethacrylate ester. It is noted that the monomethacrylate exists in the isomeric 1 and 3 forms in approximately a 1/1 ratio. While separation of these isomers is quite difficult, small samples for analytical purposes can be obtained by well known gas chromatographic techniques.

The identifying characteristics of the present esters are as follows:

| | 2,2,4-trimethyl-1,3-pentanediol monomethacrylate | 2,2,4-trimethyl-1,3-pentanediol dimethacrylate |
|---|---|---|
| Boiling Point, ° C | 80–82/0.6 mm. | 100–101/0.6 mm. |
| Specific Gravity, 20°/20° | 0.9727 | 0.9893. |
| Refractive Index, D 25° | 1.45595 | 1.45908. |
| Saponification Equivalent | 211 (theor. 214) | 140 (theor. 141). |

Example 2.—To a one-liter round-bottom flask equipped with a stirrer, Dean and Stark trap, reflux condenser, and thermometer were added 146 grams (1 mole) of TMPD, 206 grams (2.4 moles) of methacrylic acid, 10 grams of p-toluene-sulfonic acid, 200 ml. of benzene, and 0.3 of a gram of hydroquinone. The mixture was stirred at reflux for eight hours when the theoretical amount of water (36 grams) was obtained. The mixture was neutralized using 5 percent aqueous sodium bicarbonate, washed with water until neutral, and then dried. Three grams of hydroquinone were added to the crude product, and benzene was removed by flash distillation. The organic residue was then distilled through a 10-plate Oldershaw column to give 261 grams (93 percent conversion) to the dimethacrylate of TMPD, B.P. 100–101° C. at 0.6 mm.

As aforesaid, it has now been discovered that the methacrylate esters of TMPD are particularly well suited for the bonding of metallic surfaces. Since these esters contain no ether-oxygen atoms, any tendency toward peroxidation is elimniated. In addition, adhesive bonds formed by poly-2,2,4-trimethyl-1,3-pentanediol methacrylates are unusually resistant otthe corrosive effects of aqueous solutions. This unusual hydrolytic stability is attributable to the fact that TMPD is not a water-soluble glycol. Among the other properties which make these esters especially suitable as metal adhesives is that compared to other glycol dimethacrylate esters, the TMPD methacrylate esters show exceptionally low shrinkage values during the polymerization process. This property leads to increased dimensional stability of the adhesive bond. Also, the relatively low polymerization exotherm of the methacrylate esters of TMPD as compared to other glycol dimethacrylates results in less thermal degradation of the adhesive bond.

The exact ratio of diester to monoester is not critical for the adhesive compositions. Compositions containing the dimethacrylate ester in the 25–100 percent range show adhesive properties, however, a composition having a dimethacrylate ester concentration in the 50–100 percent range is preferred. In preparing these compositions, the present monomeric methacrylate esters are mixed with a conventional peroxide catalyst, such as benzoyl peroxide or t-butyl perbenzoate. Depending on the rate of curing desired, the catalyst concentration is used in a range of from about 0.0001 to about 10 percent by weight of the ester. The mixture is then applied to the metallic surfaces which then may be clamped together, and heated to 80–185° C. for periods ranging from 0.25 to 8.0 hours. We prefer to use a temperature range of 100–150° C. and a period ranging from 0.25 to 2.0 hours. The following examples will further illustrate the invention.

Example 3.—A composition consisting of 99 parts of TMPD methacrylate esters (76 percent dimethacrylate ester) and one part t-butyl perbenzoate was applied to each of two 4-inch x ½-inch x 1/16-inch pieces of steel, aluminum and chrome. An overlap of ½ inch was coated and held in contact with clamps during the curing process (40 minutes at 135° C.). The load necessary to break the samples was determined on an Instron tensile tester using an extension rate of 0.2 inch per minute. The shear strengths so determined are given in Table I. Similar formulations were prepared using 1,3-butanediol dimethacrylate. The shear strengths so obtained are also given below.

TENSILE SHEAR STRENGTHS (P.S.I.) OF METAL ADHESIVES

| Substrate | TMPD methacrylate | 1,3-butanediol dimethacrylate |
|---|---|---|
| Steel | 2,950 | 2,250 |
| Aluminum | 1,360 | 1,000 |
| Chrome | 1,100 | 750 |

Example 4.—The same experiment described in Example 3 was repeated except that 100% of the dimethacrylate ester of 2,2,4-trimethyl-1,3-pentanediol was used. The tensile shear strength so obtained using steel substrates was 2690 p.s.i.

Example 5.—The same experiment described in Example 3 was repeated except that the methacrylate ester used consisted of 52 percent of the dimethacrylate ester. The tensile shear strength so obtained on steel substrates was 2550 p.s.i.

It is noted that relatively small amounts, up to about 10%, of other vinyl monomeric materials such as butadiene may be copolymerized with these esters to give modified adhesives, for example, adhesives giving high bond strengths, but, still retaining some shock absorbing capacity.

The invention has been described in detail with particular reference to preferred embodiments thereof, but it will be understood that variations and modifications can be effected within the spirit and scope of the invention described hereinabove and in the appended claim.

We claim:
1. Mono-methacrylate of 2,2,4-trimethyl-1,3-pentanediol.

References Cited
UNITED STATES PATENTS
3,218,305 11/1965 Krieble _____ 260—89.5
3,082,243 3/1963 Davis et al. _____ 260—486

JOSEPH L. SCHOFER, *Primary Examiner.*

H. WONG, JR., *Assistant Examiner.*